(12) United States Patent
Lavinio

(10) Patent No.: US 11,172,050 B1
(45) Date of Patent: Nov. 9, 2021

(54) SELF-CONFIGURING ADAPTER

(71) Applicant: Progress Software Corporation, Bedford, MA (US)

(72) Inventor: Anthony J. Lavinio, Southampton, MA (US)

(73) Assignee: PROGRESS SOFTWARE CORPORATION, Bedford, MA (US)

( * ) Notice: Subject to any disclaimer, the term of this patent is extended or adjusted under 35 U.S.C. 154(b) by 42 days.

(21) Appl. No.: 16/421,304

(22) Filed: May 23, 2019

Related U.S. Application Data

(60) Provisional application No. 62/676,772, filed on May 25, 2018.

(51) Int. Cl.
| | |
|---|---|
| *H04L 29/08* | (2006.01) |
| *G06F 16/25* | (2019.01) |
| *G06F 16/242* | (2019.01) |
| *G06F 9/54* | (2006.01) |
| *G06N 5/02* | (2006.01) |
| *G06N 5/04* | (2006.01) |

(52) U.S. Cl.
CPC .............. *H04L 67/34* (2013.01); *G06F 9/541* (2013.01); *G06F 16/2423* (2019.01); *G06F 16/252* (2019.01); *G06N 5/025* (2013.01); *G06N 5/04* (2013.01); *H04L 67/2804* (2013.01); *H04L 67/303* (2013.01)

(58) Field of Classification Search
CPC ... H04L 67/34; H04L 67/2804; H04L 67/303; G06F 16/2423; G06F 16/252; G06F 9/541; G06N 5/025; G06N 5/04
See application file for complete search history.

(56) References Cited

U.S. PATENT DOCUMENTS

| | | | |
|---|---|---|---|
| 5,819,251 A | 10/1998 | Kremer et al. | |
| 5,822,749 A * | 10/1998 | Agarwal | G06F 12/0866 |
| 7,516,115 B2 | 4/2009 | Gupta | |
| 7,725,501 B1 | 5/2010 | Stillman et al. | |
| 8,738,593 B2 | 5/2014 | Gupta | |
| 9,471,654 B1 | 10/2016 | Bradley | |
| 9,667,704 B1 * | 5/2017 | Sonawane | H04L 67/10 |
| 9,886,483 B1 | 2/2018 | Harrison et al. | |
| 2001/0018684 A1 | 8/2001 | Mild et al. | |
| 2002/0059292 A1 | 5/2002 | Velasco | |
| 2002/0099818 A1 * | 7/2002 | Russell | H04L 69/329 |
| | | | 709/224 |

(Continued)

*Primary Examiner* — Joshua D Taylor
(74) *Attorney, Agent, or Firm* — Patent Law Works LLP

(57) ABSTRACT

A system and method for mapping an application program interface (API) to a relational schema. In one embodiment, the system samples a first endpoint, the first endpoint exposed via a first application programming interface (API); automatically infers, based on a set of results received from the first endpoint responsive to the sampling and based on a set of inference rules, a first set of data types and a first relational data structure representing data stored by the first endpoint and exposed via the first API; generates a configuration profile based on the first set of inferred data types and the first relational data structure representing the data stored by the first endpoint and exposed via the first API; and obtains, using the configuration profile and via the first application programming interface, data from the first endpoint responsive to a query, the query received in a relational query language.

20 Claims, 5 Drawing Sheets

(56) References Cited

U.S. PATENT DOCUMENTS

| | | | |
|---|---|---|---|
| 2013/0166568 A1* | 6/2013 | Binkert | G06F 16/86 707/741 |
| 2013/0173664 A1 | 7/2013 | Xue et al. | |
| 2015/0186819 A1 | 7/2015 | Patel et al. | |
| 2015/0286747 A1 | 10/2015 | Anastasakos et al. | |
| 2016/0086222 A1 | 3/2016 | Kurapati | |
| 2017/0052766 A1 | 2/2017 | Garipov | |

* cited by examiner

SELF-CONFIGURING ADAPTER

CROSS-REFERENCE TO RELATED APPLICATIONS

This application claims priority, under 35 U.S.C. § 119, of U.S. Provisional Patent Application No. 62/676,772, filed May 25, 2018 and entitled "Adapter for Exposing and Mapping an API to a Relational Schema," the entirety of which is hereby incorporated by reference.

FIELD OF INVENTION

The present disclosure relates to mapping an application program interface (API) to a relational schema.

BACKGROUND

Endpoints are increasingly being exposed as services by applying API interfaces (e.g. using Internet APIs such as representational state transfer (REST) and simple object access protocol (SOAP)). Many applications, or their associated drivers, assume data sources have a relational schema. For example, many applications, or their associated drivers, utilize the structured query language (SQL), which is a domain-specific language used in programming and designed for managing data held in a relational schema. Therefore, a mapping data of an endpoint exposed through an API interface to a relational schema, so that a relational query language, such as SQL, may be executed to obtain data from such an endpoint is useful.

However, generating such a mapping poses problems. The schema of the service may change over time, which makes an accurate mapping temporary. The schema of the service is not machine readable, is inaccurate, or both, so the mapping is manually performed by a person, which is time consuming and risks introduction of human error. Additionally, the manual mapping typically relies on documentation. However, for various reasons, there may be little documentation, no documentation, or inaccurate documentation for the schema of the endpoint, which makes mapping that schema to a relational schema all the more difficult.

Therefore, a need exists for an improved adapter, which can expose endpoints accessible via an API interface as relational data.

SUMMARY

In general, an innovative aspect of the subject matter described in this disclosure may be embodied in methods that include sampling, using one or more processors, a first endpoint, the first endpoint exposed via a first application programming interface (API); automatically inferring, using the one or more processors, based on a set of results received from the first endpoint responsive to the sampling and based on a set of inference rules, a first set of data types and a first relational data structure representing data stored by the first endpoint and exposed via the first API; generating, using the one or more processors, a configuration profile based on the first set of inferred data types and the first relational data structure representing the data stored by the first endpoint and exposed via the first API; and obtaining, using the one or more processors, using the configuration profile and via the first application programming interface, data from the first endpoint responsive to a query, the query received in a relational query language.

Other implementations of one or more of these aspects include corresponding systems, apparatus, and computer programs, configured to perform the actions of the methods, encoded on computer storage devices. These and other implementations may each optionally include one or more of the additional features.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
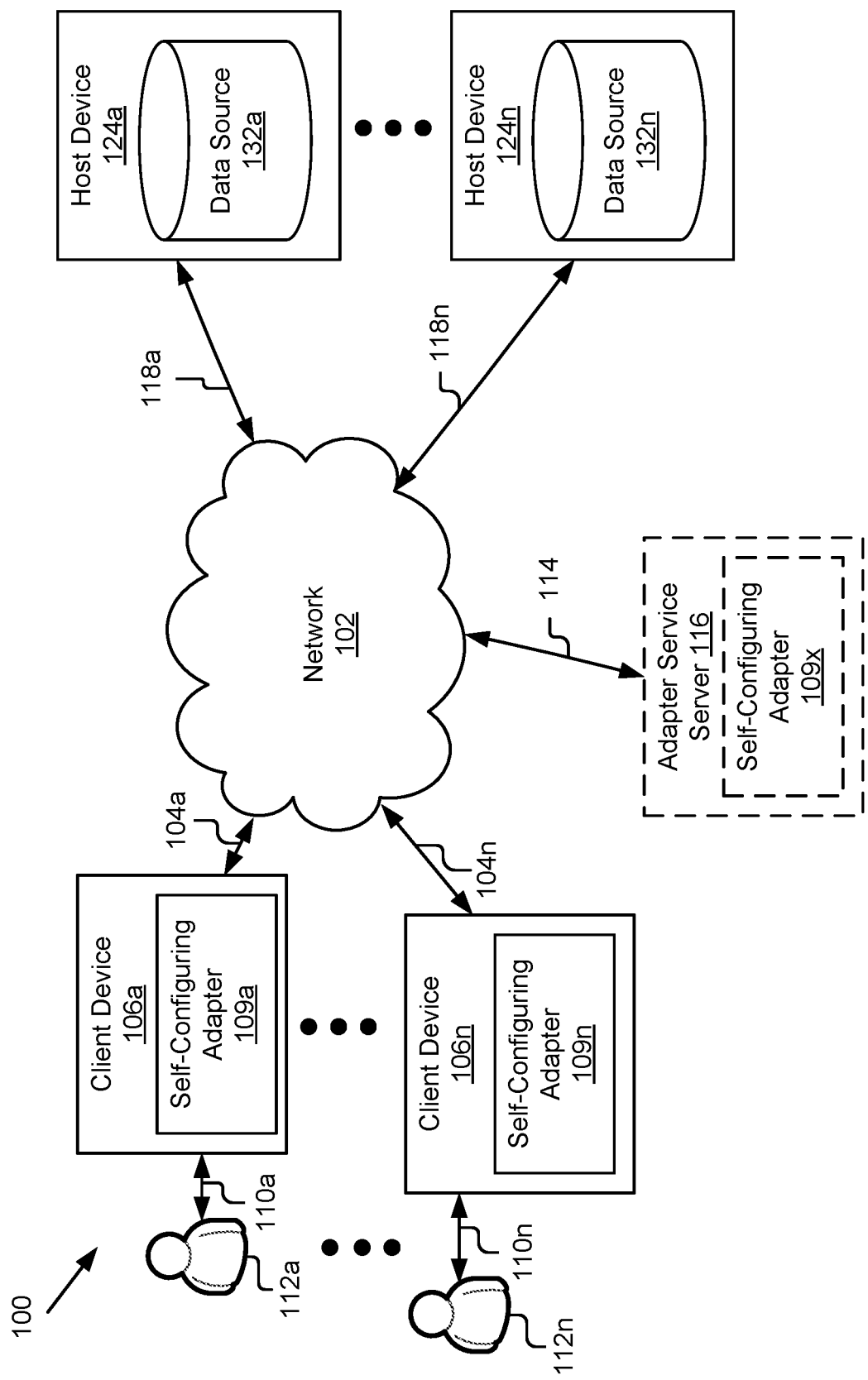
FIG. 1 is a block diagram illustrating an example system for a self-configuring adapter according to one embodiment.

FIG. 1 is a block diagram illustrating an example system 100 for a self-configuring adapter according to one embodiment. The illustrated system 100 includes client devices 106a . . . 106n, host devices 124a . . . 124n, and, optionally, an adapter service server 116, which are communicatively coupled via a network 102 for interaction with one another. For example, the client devices 106a . . . 106n (also referred to individually and collectively as 106) may be respectively coupled to the network 102 via signal lines 104a . . . 104n and may be accessed by users 112a . . . 112n (also referred to individually and collectively as 112) as illustrated by lines 110a . . . 110n. The adapter service server 116 may be coupled to the network 102 via signal line 114. The host devices 124a . . . 124n may be respectively coupled to the network 102 via signal lines 118a . . . 118n. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets)

that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the Hypertext Markup Language (HTML), the Extensible Markup language (XML), JavaScript Object Notation (JSON), YAML Ain't Markup Language (YAML), Electronic Data Interchange (EDI) including those in the EDIFACT and X12 families, ACORD/AL3, various National Council for Prescription Drug Programs (NCPDP) standards, Comma Separated Values (CSV), etc. In addition, all or some data can be encrypted using encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client devices 106 are computing devices having data processing and communication capabilities. While FIG. 1 illustrates two client devices, 106a and 106n, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices. In the depicted implementation, the client devices 106a . . . 106n respectively contain instances 109a . . . 109n of a self-configuring adapter 109 (also referred to individually and collectively as self-configuring adapter 109). The self-configuring adapter 109 may be storable in a memory and executable by a processor of a client device 106.

The host devices 124 are computing devices having data processing and communication capabilities. While FIG. 1 illustrates two host devices, 124a and 124n, the present specification applies to any system architecture having one or more host devices 124. In some embodiments, a host device 124 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The host device 124 may couple to and communicate with other entities of the system 100 via the network 102 using a wireless and/or wired connection.

Examples of a host device 124 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. For example, the host device 124 may include one or more hardware servers, server arrays, storage devices, systems, etc., and/or may be centralized or distributed/cloud-based. In some implementations, the host device 124 may include one or more virtual servers, which operate in a host server environment and access the physical hardware of the host server including, for example, a processor, memory, storage, network interfaces, etc., via an abstraction layer (e.g., a virtual machine manager). While two host devices 124 are depicted in FIG. 1, the system 100 may include any number of host devices 124. In addition, a plurality of host devices 124 may be of the same or different types of computing devices.

Depending on the embodiment, the host devices 124 may be associated with the same or different services. Depending on the embodiment, the host devices 124 may expose their respective data sources using a common API (e.g. REST or SOAP) or a mixture of APIs (e.g. host device 124a may expose data maintained in data source 132a through a RESTful API and host device 124n may expose data maintained in data source 132n through a SOAP API).

In the depicted implementation, the host device 124 includes a local data source 132. However, in some embodiments, the host device 124 is coupled to a Direct Access Storage (not shown) via a signal line (not shown).

In some embodiment, the features and functionality of the self-configuring adapter 109 may be offered as an online service. In one such embodiment, the self-configuration adapter 109x, or portions of a self-configuration adapter 109 described further with reference to FIG. 3, may reside on an adapter service server 116. The adapter service server 116 may include one or more computing devices having data processing, storing, and communication capabilities. For example, the adapter service server 116 may include one or more hardware servers, server arrays, storage devices, systems, etc., and/or may be centralized or distributed/cloud-based. In some implementations, the adapter service server 116 may include one or more virtual servers, which operate in a host server environment and access the physical hardware of the host server including, for example, a processor, memory, storage, network interfaces, etc., via an abstraction layer (e.g., a virtual machine manager).

It should be understood that the system 100 illustrated in FIG. 1 is representative of an example system for a self-configuring adapter according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into a single computing device or system or additional computing devices or systems, etc.

Figure 2:
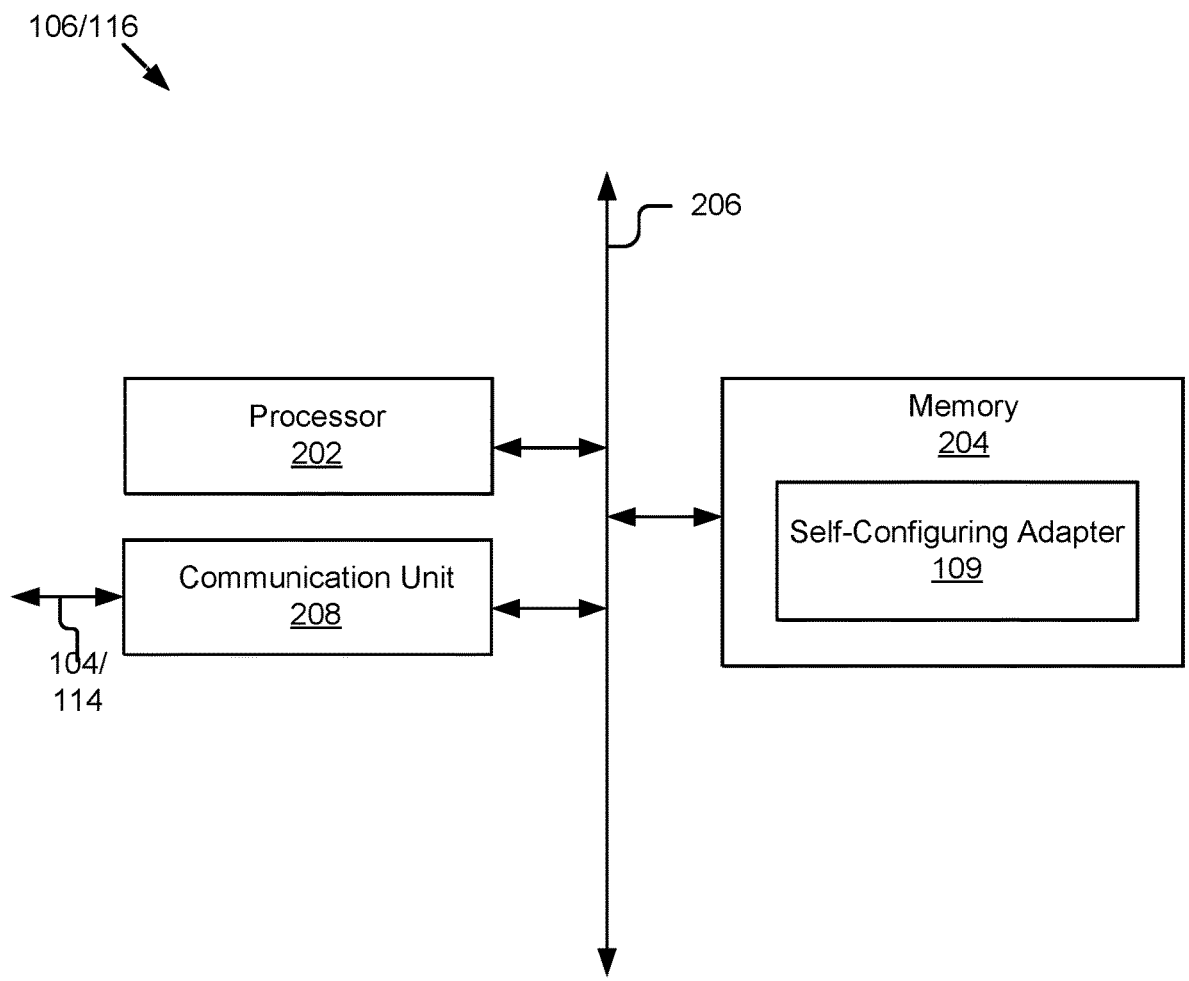
FIG. 2 illustrates an example an example computing device according to one embodiment.

FIG. 2 illustrates an example computing device according to one embodiment. In one embodiment, a computing device such as a client device 106 or adapter service server 116, may include a processor 202, a memory 204, and a communication unit 208, which may be communicatively coupled by a bus 206. However, it should be understood that a computing device may take other forms and include additional or fewer components without departing from the scope of the present disclosure. For example, a computing device may include input and output devices (e.g., a display, a keyboard, a mouse, touch screen, speakers, etc.), various operating systems, sensors and other physical configurations.

The processor 202 may execute code, routines and software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory of the computing device via the bus 206 to access data and instructions therefrom and store data therein. The bus 206 may couple the processor 202 to the other components of the computing device including, for example, the memory 204 and communication unit 208.

The memory 204 may store and provide access to data to the other components of the computing device. In some implementations, the memory 204 may store instructions and/or data that may be executed by the processor 202. For example, the memory 204 may store the self-configuring adapter 109. The memory 204 is also capable of storing other instructions and data, including, for example, an operating system, hardware drivers, other software applications, databases, etc. The memory 204 may be coupled to the bus 206 for communication with the processor 202 and the other components of the computing device. In one embodiment, the memory 204 of the computing device stores the code and routines that, when executed by the computing device's processor 202, perform the functions as described herein. For example, the functionality described below with reference to the self-configuring adapter 109 may be performed when code and routines associated with the self-configuring adapter and stored in memory 204 are executed by the processor 202.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory may be a single device or may include multiple types of devices and configurations.

The bus 206 can include a communication bus for transferring data between components of a computing device or between computing devices, a network bus system including the network 102 or portions thereof, a processor mesh, a combination thereof, etc. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor to the network 102, which may in turn be coupled to other processing systems. The communication unit 208 can provide other connections to the network 102 and to other entities of the system 100 using various standard network communication protocols, including, for example, those discussed elsewhere herein.

As mentioned above, a computing device may include other and/or fewer components. Examples of other components may include a display, an input device, a sensor, etc. (not shown). In one embodiment, the computing device includes a display. The display may display electronic images and data output by the computing device for presentation to a user. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user, etc. For example, the display may be a capacitive touch-screen display capable of detecting and interpreting multiple points of contact with the display surface.

The input device (not shown) may include any device for inputting information into the computing device. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user. For example, the user could interact with an emulated (i.e., virtual or soft) keyboard displayed on the touch-screen display by using fingers to contacting the display in the keyboard regions.

Figure 3:
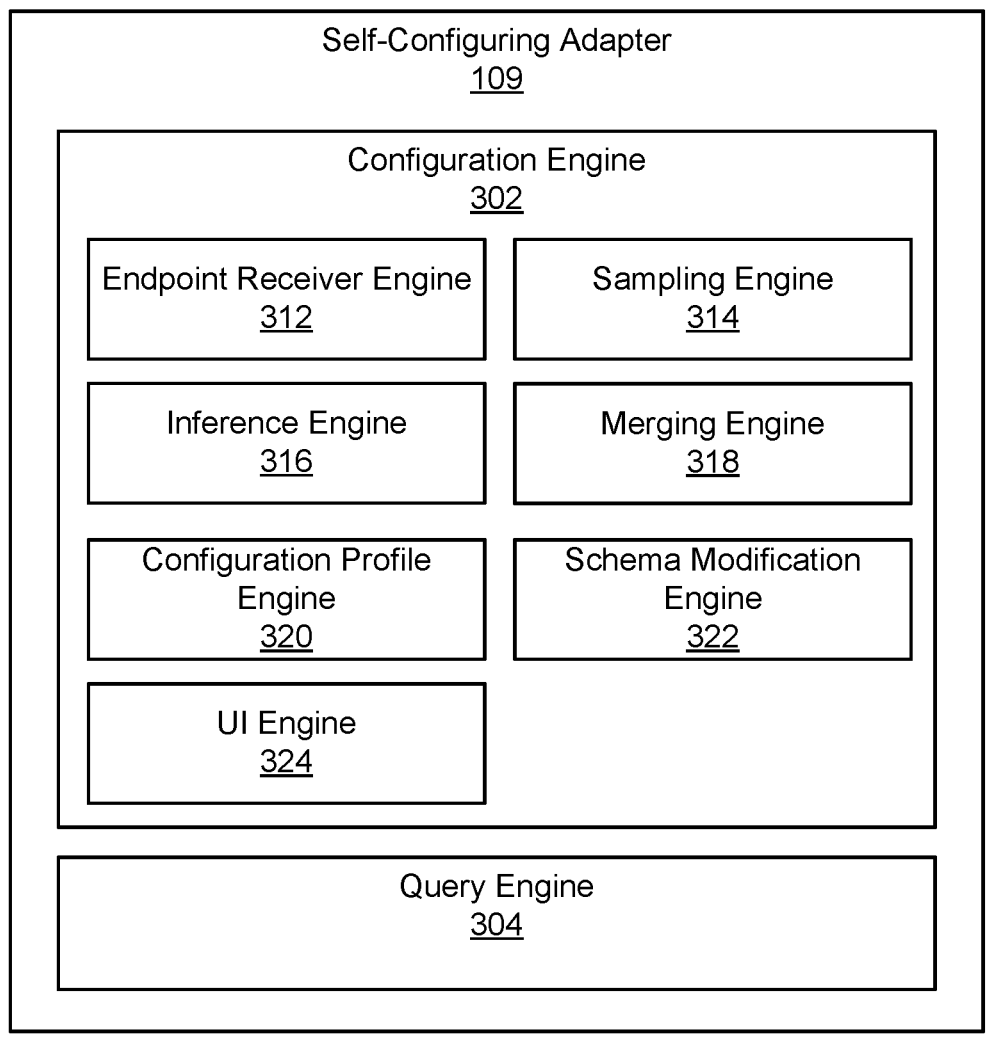
FIG. 3 is a block diagram illustrating an example self-configuring adapter according to one embodiment.

Referring now to FIG. 3, a block diagram illustrating an example self-configuring adapter 109 is described in more detail according to one embodiment. In one embodiment, the self-configuring adapter 109 includes a configuration engine 302 and a query engine 304.

The engines (e.g. 302 and 304), sub-engines (e.g., 312, 314, 316, 318, 320, 322, and 324), or combination thereof can be software or routines for providing the features and functionalities described herein. In one embodiment, the engines, sub-engines, or subset thereof are a set of instructions executable by the processor 202. In one embodiment, the engines, sub-engines, or subset thereof are stored in the memory 204 and are accessible and executable by the processor 202. In one embodiment, the engines, sub-engines, or subset thereof are adapted for cooperation and communication with the processor 202 and other components of the computing device including other engines, sub-engines or subset thereof.

In one embodiment, the configuration engine 302 produces a configuration profile (not shown) used by the query engine 304 to expose one or more endpoints via one or more API interfaces as a relational data source and obtain data therefrom responsive to a relational language query (e.g. a SQL query). For example, the query engine 304 uses the configuration profile to map a relation query to one or more API queries, map the response(s) to the one or more API queries, and return a rational result (e.g. a SQL result).

It should be recognized that the description herein refers to SQL for clarity and convenience. However, the description herein is not limited to SQL. It should be recognized that the description herein is applicable to many languages which other than SQL. Examples include but are not limited to SOQL (Salesforce's language based on SQL), CQL (Cassandra's language based on SQL), XQuery (a language with a different syntax, primarily designed for working with XML, but whose semantics largely mimic SQL), Progress OpenEdge ABL (a language with query constructs that work against relational data, which behave similar to SQL in this context), and other SQL-like languages (i.e. languages with similar, or common, attributes to SQL).

In some embodiments, the configuration profile produced by the configuration engine 302 is generated on-the-fly and de novo for each individual session. For example, assume a user 112 creates a new session by accessing an application (not shown) that uses the query engine 304; in one embodiment, the configuration engine 302 produces a new configuration profile for the session. Such embodiments may beneficially capture recent changes to the data (e.g. data type(s), structure, etc.) exposed via the API interface. For example, assume that the data exposed via an API interface are "tweets" and Twitter increased the maximum number of characters in a "tweet" from 140 to 280 characters; in one embodiment, such a change can be detected and reflected in the configuration profile in a new session after the change in the maximum number of characters goes into effect.

In some embodiments, the configuration profile produced by the configuration engine 302 may be updated. Depending on the embodiment, the updating may be time based (e.g. updating after a predefined period of time has passed since a last update) or event based (e.g. updating after a predefined number of sessions, responsive to explicit user request, responsive to receiving a modification from the user, etc.). For example, if the configuration profile is more than 2 weeks old, additional samples are taken, compared to the relational schema of the current configuration profile, and modifications (e.g. increasing maximum number of characters from 140 to 280) may be made to update the configuration profile. In another example, when a new session is created, additional samples are taken, compared to the relational schema of the current configuration profile, and modifications (e.g. increasing maximum number of characters from 140 to 280) may be made to update the configuration profile (rather than create an entirely new configuration profile). Such embodiments may beneficially capture recent changes to the data (e.g. data type or structure) exposed via the API interface.

In some embodiments, the configuration profile may be shared, e.g., by distributing instances of the configuration profile. For example, the configuration engine 302 on client device 106a generates a configuration profile, and shares the configuration profile with client device 106n. The query engine 304 of client device 106a can use the configuration profile to query the endpoint exposed by the API interface, and the query engine 304 of client device 106n can also use the configuration profile, which has shared with client device 106n, to query the endpoint exposed by the API interface, thereby eliminating the need for the client device 106n to generate its own configuration profile using, e.g., a local configuration engine 302.

In one embodiment, the configuration engine 302 includes an endpoint receiver engine 312, a sampling engine 314, an inference engine 316, a merging engine 318, a configuration profile engine 320, a schema modification engine 322, and a user interface (UI) engine 324. Each of these components is coupled for communication with each other and the other components of the self-configuring adapter 109.

The endpoint receiver engine 312 obtains one or more identifiers of one or more endpoints exposed via an API interface. Depending on the embodiment, the identifier may vary. Examples of an identifier may include, but are not limited to a Uniform Resource Name (URN), a Uniform Resource Identifier (URI), a Uniform Resource Locator (URL), file path, embedded resource location, object or stream handle, memory location, serialized object, etc. For example, assume a web service (e.g. hosted on host device 124a) provides city codes (data stored on data source 132a) through a website using a RESTful interface. In one embodiment, the endpoint receiver engine 312 obtains an identifier, such as a URL of the web service from the user via user input. For example, the user 112 inputs the URL into a field generated by the UI engine 324 and rendered for display on the client device 106.

Depending on the embodiment and the use case, the endpoint receiver engine 312 may receive an identifier of one endpoint exposed via an API interface or multiple endpoints exposed by an API interface. In the case of multiple endpoints exposed by an API interface, depending on the embodiment and use case, the multiple endpoints may be exposed by a common API interface (e.g. all exposed using a REST API interface or all exposed using a SOAP API interface), or the multiple endpoints may be exposed by multiple, heterogeneous API interfaces (e.g. one or more exposed using a REST API interface and one or more exposed using a SOAP API interface).

It should be noted that REST and SOAP APIs are referred to occasionally throughout this description for clarity and convenience. However, these are merely examples of APIs and others exist and are within the scope of this disclosure.

It should also be recognized that some of the examples herein often utilize JSON as the syntax. However, JSON is merely one example and others exist and are within the scope of this disclosure. For example, any syntax expressing flat or tree structures, such as XML, YAML, EDI such as those in the EDIFACT and X12 families, ACORD/AL3, the various NCPDP standards or a combination thereof may be used.

The sampling engine 314 samples data from the endpoint. In one embodiment, the sampling engine 314 samples the endpoint by sending one or more queries via the API interface, occasionally referred to herein as API queries, and receives one or more responses. For example, the sampling engine 314 queries a service (e.g. Twitter) via API interface (e.g. a REST API interface using one or more "get" or "post" queries) for the one hundred most recent data entries (e.g. tweets), and the sampling engine 314 receives the one hundred most recent data entries from the data source 132 (i.e. an endpoint maintained by Twitter) via the REST API interface.

It should be recognized that the performance of sampling and subsequent use to make inference(s), for example, regarding scalar data types and complex data types, does not rely on the availability of accurate and complete human-readable documentation, nor does the performance and use of sampling to make inferences rely on complete and accurate direct metadata (i.e. metadata returned by the API with the data itself or responsive to a separate call), or even the presence of direct metadata, which is advantageous.

In some embodiments, the sampling is based on recentness of data. For example, the most recent data is sampled. This may be beneficial in that the most recent data may better reflect the schema (e.g. a maximum of 280 character rather than 140 in the Twitter example). In one such embodiment, the sampling engine 314 samples a predetermined number of most recent data. For example, the sampling engine 314 queries a service (e.g. Twitter) via API interface (e.g. a REST API interface using one or more "get" or "post" queries) for the one hundred (i.e. the predetermined number) most recent data entries (e.g. tweets), and the sampling engine 314 receives the one hundred most recent data entries from the data source 132 (i.e. an endpoint maintained by Twitter) via the REST API interface. In another such embodiment, the sampling engine 314 samples a predetermined time period of the most recent data. For example, the sampling engine 314 queries a service (e.g. Twitter) via API interface (e.g. a REST API interface using one or more "get" or "post" queries) for the entries within the last X seconds (e.g. tweets within the last minute), and the sampling engine 314 receives the tweets within the last minute as the most recent data entries from the data source 132 (i.e. an endpoint maintained by Twitter) via the REST API interface.

In some embodiments, the sampling is based on one or more user generated API queries. For example, a user 112 generates and enters one or more API queries to sample the data from the endpoint (e.g. by providing "get" or "post" queries via a user interface associated with the self-configuring adapter 109).

The inference engine 316 receives the set of results in response to the sampling queries and makes inferences about the data maintained by the endpoint and the appropriate representation of that data in a relational schema. In some embodiments, the inferences are based on a set of inference rules. The inference rules do not rely on the accuracy of API documentation or even the existence thereof. For example, in some embodiments. The API documentation, if any exists, is not used as an input by the system 100 or by the inference engine 316. Additionally, the sampling and use of inference rules result in machine readability of the schema of the endpoint(s) exposed by the API interface(s), which is advantageous and differs from the traditional, manual mapping by users reliant upon API documentation.

In one embodiment, the inference engine 316 uses the set of inference rules, which includes inference rules for inferring simple data types. For example, the inference engine 316 determines whether the samples include "true" or "false," and infers a Boolean data type for the relational representation when present.

In another example, the inference engine 316, when numeric data is received, determines a range of the numeric data and determines a numeric data type based on the range. For example, the inference engine determines whether the numeric values fall within the range of a 32- or 64-bit integer, or a float, or a double, or a larger number where all the digits should be preserved. In one embodiment, the data type that is associated with the smallest unit of storage while covering the range of the received numeric data is determined by the inference engine 316. In some embodiments, when a maximum, or minimum, number from the received data is within a predefined proximity to an edge of a data type's associate range, the data type is increased, by the inference engine 316, to the next higher unit of storage, to allow for values that may be present but that were not present in the sampling.

In another example, the inference engine 316, when numeric data is received, determines whether the numeric data has the same length, and when that is the case treats the number as a code. For example, the inference engine 316 determines that the data includes 5 digit numbers and infers that the numbers are zip codes.

In another example, the inference engine 316, when quoted strings in the data returned are numeric, the inference engine 316 determines a range of the numbers within the quoted strings and determines a numeric data type based on the range. For example, the inference engine determines whether the numeric values received within the quoted strings fall within the range of a 32- or 64-bit integer, or a float, or a double, or a larger number where all the digits should be preserved. In one embodiment, the data type that is associated with the smallest unit of storage while covering the range of the received numeric data is determined by the inference engine 316. In some embodiments, when a maximum, or minimum, number from the received data is within a predefined proximity to an edge of a data type's associate range, the data type is increased, by the inference engine 316, to the next higher unit of storage, to allow for values that may be present but that were not present in the sampling.

In another example, the inference engine 316 determines whether data returned from the endpoint exposed by the API is patterned like a universal unique identifier (UUID) or globally unique identifier (GUID). For example, the inference engine 316 determines the data returned includes data having the format 8-4-4-4-12 hex digits, and infers that data is a GUID.

In another example, the inference engine 316 determines whether a string contains only the characters a-z, A-Z, 0-9 and "+" and "/" (or "−" and "_"), and is over a defined length, and infers a base-64 binary.

In another example, the inference engine 316 determines whether a string's composed of data solely with the format yyyy-mm-dd, and infers a date. In other examples, the inference engine applies similar rules for inferring times, date-times, and time zone variants.

In another example, the inference engine 316, for strings, measures the size, and applies a scaling factor. For example, the longest string received was Y characters, long, so the inference engine sets 1.5×Y as the maximum to allow for data which may not have been encountered in the sampling. For example, assume the longest tweet received in the sampling was 240 characters; in one embodiment, the inference engine 316 applies a scaling factor of 1.25 and determines the maximum allowable string to be 300 characters (i.e. 240×1.25=300). It should be noted that, in the above example, the inference engine 316 sets the maximum without reliance on any documentation, human intervention, or direct metadata received from the Twitter endpoint. It should further be recognized that the factors 1.25 and 1.5 are merely example scaling factors and others are contemplated and within the scope of this disclosure. Similar rules for the binary sequences may be applied by the inference engine 316.

In another example, the inference engine 316 determines whether instances of a column have the same length, and uses Char or Binary instead of VarChar or VarBinary types.

In another example, the inference engine 316 determines whether contents are longer than a defined threshold and bump to LongVarChar or LongVarBinary.

In some embodiments, for the foregoing examples, the inference engine 316 determines whether the observed pattern exists in a portion of the data received in response to the sampling that is sufficient to satisfy a threshold. For example, the inference engine 316 determines that, when a pattern is present less than X % of times, it is ignored. In some embodiments, in such cases, the inference engine 316 may determine whether to throw an error, or a warning, or return null when the value encountered was one of these below-the-threshold types.

In one embodiment, the inference engine 316 uses the set of inference rules, which includes inference rules for inferring complex data types. Examples of complex types include, but at not limited to, flattened tables, maps, variants, etc. For example, assume a nested object, like this:
{
"name":"Campus",
"location":{
"latitude":42.3912,
"longitude":72.5267,
"elevation":50
}
}
is received in response to the sampling the endpoint. In one embodiment, the inference engine 316 infers four fields (i.e. "name," "latitude," "longitude," and "elevation," since "location" is a container, it may be used as the name for the nested table and is not treated as a field), and treats them as one table containing the outer field (i.e. "name"), and an inner table joined on a 1:1 relation with three fields (i.e., ""latitude," "longitude," and "elevation"). This results in a first table as a single column ("name"), and a second, inner table that has four columns ("name," "latitude," "longitude," and "elevation"). Alternatively, the inference engine 316 flattens the inner fields ("latitude," "longitude," and "elevation"), since they do not repeat, which is a relational representation of the nested object of the endpoint. This results in a table with four columns ("name," "latitude," "longitude," and "elevation").

In one embodiment, the inference engine 316 may recognize a repeating, nested object. For example, assume a repeating, nested object like this:
{
"name":"Campus",
"buildings":[
"Totmin",
"Morrill",
"Whitmore",
"Flint"
]
}

In one embodiment, the inference engine 316 infers this nested object as two tables, one with the one field and one joined in 1:N relation with 2 columns, a primary and an index (or a primary key and a value, depending on the embodiment, since the values are unique). In one embodiment, when every instance has exactly four entries (or up to four entries), the inference engine 316 flattens this into a single table of 5 columns.

In one embodiment, when sampling the endpoint via the API returns keys with similar structures, similar to:
{
"2018-01-01":{"high":10000,"low":9909,"volume":1000000},
"2018-01-02":{"high":11000,"low":9099,"volume":2000000},
"2018-01-03":{"high":10100,"low":9090,"volume":1500000},
"2018-01-04":{"high":10010,"low":9009}
}
the inference engine 316 infers the data may be represented as a table even though it is not an array (where the position is the index, or key, that uniquely identifies the row); it is a map (where an explicit key value can be used to uniquely identify the row). For example, the inference engine 316 infers a relation table like this:

| key | high | low | volume |
| --- | --- | --- | --- |
| 2018-01-01 | 1000 | 9909 | 1000000 |
| 2018-01-02 | 11000 | 9099 | 2000000 |
| 2018-01-03 | 10100 | 9090 | 1500000 |
| 2018-01-04 | 10010 | 9009 | Null |

So, in one embodiment, the inference engine 316 infers, based on the inference rules, that this is a MAP of key-value pairs, with the key being a date and the values being the numbers, and convert this to a table with separate rows. In one embodiment, when the inference engine 316 sees the same name but with different structures, it may infer this as a VARIANT type.

In one embodiment, the inferences made by the inference engine 316 may be set by default. In one embodiment, the default may be modified by user preference settings, and the default or user preferences may be overridden by explicit user input via the schema modification engine 322 described below.

The merging engine 318 merges relational structures (e.g. tables, maps, variants, etc.) generated by the inference engine 316. For example, the merging engine 318 may join a table inferred from a first endpoint (e.g. a table of airport codes and airport names) with another table inferred from data received from a second endpoint (e.g. table of cities and names of nearest airports). In another example, the merging engine 318 may normalize relational structure(s) inferred from a first endpoint and relational structure(s) inferred from data received from a second endpoint into separate tables.

The configuration profile engine 320 generates a configuration profile based on the inferences made by the inference engine 316 and any merges made by the merging engine 318. The configuration profile is useable to configure the query engine 304 so that the query engine may receive a query in a relational query language (e.g. SQL), occasionally referred to herein as a "relational query" or similar, map the relational query into one or more API queries (e.g. using REST or SOAP) for one or more endpoints, receive responses (e.g. in the JSON syntax) from the one or more endpoints via their respective API, and return a relational response (e.g. in SQL). The relational response using the data type(s) and relational structure(s) described with reference to the inference engine 316 and, if applicable, the merging engine 318.

The schema modification engine 322 modifies the schema of the relational representation generated by the inference engine 316 and the merging engine 318, which is subsequently used to generate the configuration profile, which then used to configure the query engine 304 and expose the one or more endpoints exposed via one or more APIs as relational data sources. It should be apparent that the data being queried in the relational query is stored and maintained by the one or more endpoints (e.g. in 132a of host device 124a and/or in 132n of host device 132n). The system 100 described herein does not migrate or export, transform, and load the data of the one or more endpoints into and maintain a separate relational database, nor does the system 100 query such a relational database; therefore, the system 100 does not require the costly overhead of building and synchronizing a separate relational database that duplicates the data of the one or more endpoints maintained by the service.

Depending on the embodiment, a variety of types of modifications may be available via the schema modification engine 322. In one embodiment, the schema modification engine 322 modifies a default setting. For example, the default may be changed so that a parent-child normalization is performed by the merging engine 318 rather than flattening. In another example, a default for parent-child normalization over flattening, when a non-repeating nested object is encountered, may exist.

In one embodiment, the schema modification engine 322 modifies preferences so that one or more an inference and a merging is not made or is made differently (by the inference engine 316 or merging engine 318, respectively). For example, the user may modify, via the schema modification engine 322, a preference for parent-child normalization over other possible forms of normalization (e.g. flattening, unwinding, etc.) for inferences and/or merging (e.g. by interacting with a graphical element such as a check box, radio button, drop-down menu, etc. generated by the UI engine 324). In another example, the user may modify, via the schema modification engine 322, a preference thereby inhibiting normalization from a user-indicated point downward, returning the nested objects beyond the user-indicated point as serialized JSON.

In one embodiment, the schema modification engine 322 allows editing on a per-endpoint basis. For example, assume the longest Tweet sampled was 138 characters and the inference engine inferred a maximum of 207 characters (i.e. 1.5 times 138), but a user knows that the maximum has recently been changed to 280 characters. The user may modify the maximum string length to be 280 implemented. In embodiments, that modification is not just made in the present configuration file, but remembered and used when a configuration profile is generated for that same endpoint in the future. For example, when the configuration profile is generated on a per-session basis, the maximum string length will persist, remaining at 280 characters from one session to the next.

In one embodiment, the schema modification engine 322 causes one or more of the inference engine 316, merging engine 318, and configuration profile engine 320 to re-execute, responsive to receipt of a modification, to implement the modification in the configuration profile. In one embodiment, the query engine 304 will be re-executed to configure itself with the newly modified configuration profile. In some embodiments, the query engine 304 configures itself with the most recently generated configuration profile available on a per-query or per-session basis, so modifications to the configuration profile are implemented.

The UI engine 324 generates user interfaces for obtaining user input and providing information to the user. Examples of such interfaces may include, but are not limited to a user interface for receiving an identification of an endpoints exposed via an API interface, a user interface displaying data responsive to the sampling and/or the relational representation thereof, a user interface allowing the user to modify the relational representation, and a user interface providing data obtained from one or more endpoints responsive to a query received in a relational query language.

Example Methods

Figure 4:
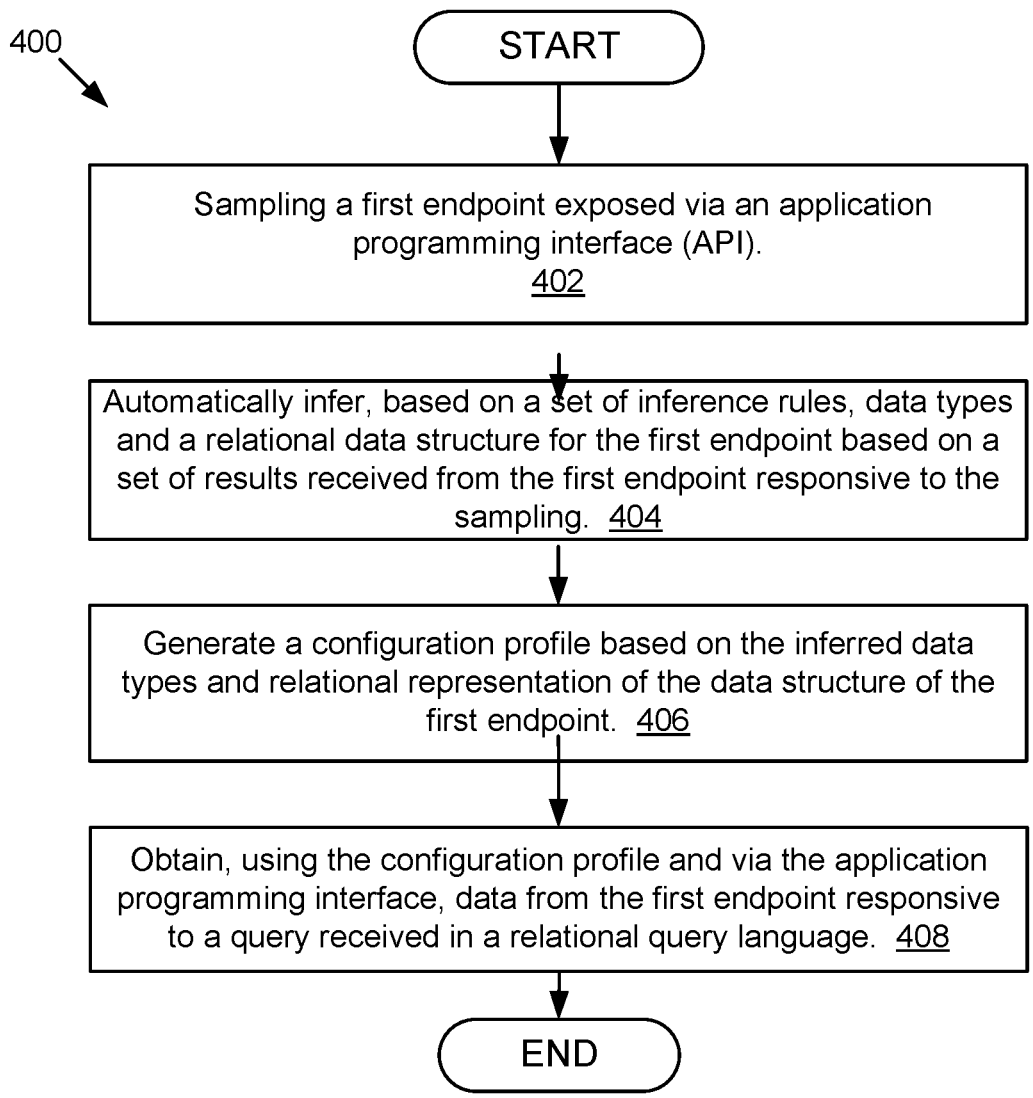
FIG. 4 is a flowchart of an example method for a self-configuring adapter according to one embodiment.
Figure 5:
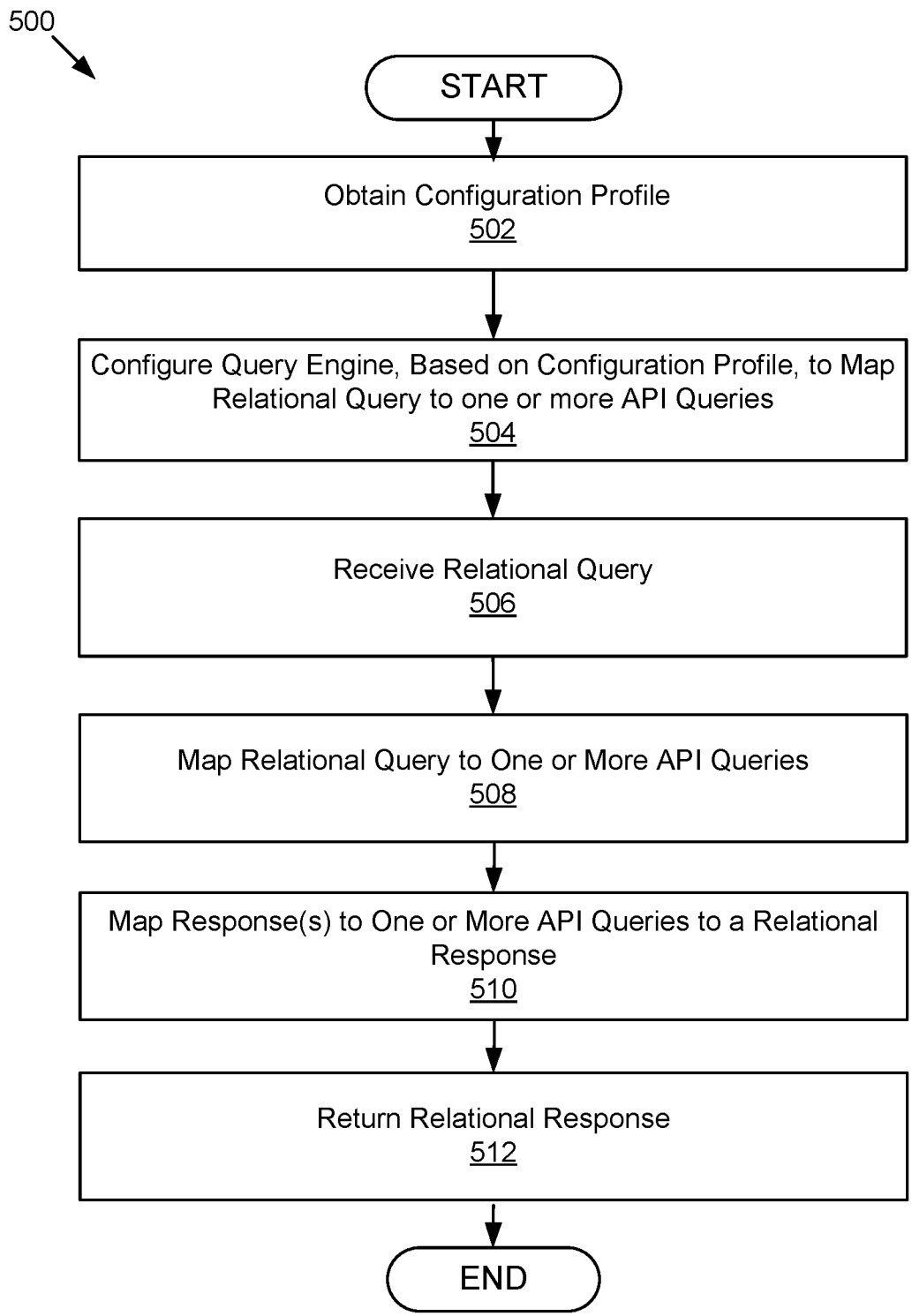
FIG. 5 is a flowchart of an example method for configuring a query engine using a configuration profile and using the configured query engine to expose an endpoint using an API interface as a relational data source according to one embodiment.

FIGS. 4 and 5 depict example methods 400 and 500 performed by the system described above in reference to FIGS. 1-3 according to some embodiments. However, it should be recognized that the methods described herein are merely examples and that other examples and embodiments exist.

Referring to FIG. 4 an example method 400 for a self-configuring adapter according to one embodiment is shown. At block 402, the sampling engine 314 samples a first endpoint exposed via an application programming interface (API). At block 404, the inference engine 316 automatically infers, based on a set of inference rules, data types and a relational data structure for the first endpoint based on a set of results received from the first endpoint responsive to the sampling. At block 406, the configuration profile engine 320 generates a configuration profile based on the inferred data types and relational data structure for the first endpoint. At block 408, the query engine 304 obtains, using the configuration profile and via the application programming interface, data from the first endpoint responsive to a query received in a relational query language.

Referring to FIG. 5, an example method 500 for configuring a query engine using a configuration profile and using the configured query engine to expose an endpoint using an API interface as a relational data source according to one embodiment is shown. At block 502, the query engine 304 obtains a configuration profile. At block 504, the query engine 304 configures itself based on the configuration profile in order to map a relation query to one or more API queries. At block 506, the query engine 304 receives a relational query (e.g. written in SQL), and, at block 508, maps that relational query to one or more API queries (e.g. one or more REST API queries). At block 510, the query engine 304 maps the response(s) from one or more endpoints to the one or more API queries (e.g. represented in JSON) to a relational response (e.g. using SQL) and, at block 512, returns the relational result.

Other Considerations

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment," "an embodiment," "one implementation" or "an implementation" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the method blocks. The structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure not limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   sampling, using one or more processors, a first endpoint, the first endpoint exposed via a first application programming interface (API);
   receiving, using the one or more processors, from the first endpoint and responsive to the sampling of the first endpoint, a first set of results, wherein the first set of results is a subset of data exposed by the first endpoint via the first API;
   automatically extrapolating, using the one or more processors, from the first set of results received from the first endpoint responsive to the sampling and based on a set of inference rules, an initial set of data types and an initial relational data structure representing the data stored by the first endpoint and exposed via the first API, the data stored by the first endpoint including the first set of results and additional data;
   generating, using the one or more processors, a configuration profile based on the initial set of data types and the initial relational data structure representing the data stored by the first endpoint and exposed via the first API, the data stored by the first endpoint including the first set of results and additional data;
   receiving a query in a relational query language; and
   obtaining, using the one or more processors, using the configuration profile and via the first API, a second set of results from the first endpoint responsive to the query in the relational language, the second set of results including a subset of the additional data.

2. The method of claim 1 further comprising:
   merging the initial set of extrapolated data types and initial relational data structure representing the data stored by the first endpoint and exposed via the first API with a second set of extrapolated data types and a second relational data structure representing the data stored by a second endpoint.

3. The method of claim 2, wherein the second endpoint is exposed via a second API, and the first API and second API differ.

4. The method of claim 1 further comprising:
   obtaining user input requesting modification; and
   generating a new configuration profile based on the requested modification.

5. The method of claim 4, wherein the user input requesting modification is a request to modify one or more of a data type, data structure, and normalization type.

6. The method of claim 1, wherein the sampling obtains the first set of results, which represent most recent data of the first endpoint.

7. The method of claim 1 further comprising:
   updating the configuration profile responsive to one or more of a user-initiated request and automatically based on satisfaction of a criterion.

8. The method of claim 1, wherein the sampling, automatic extrapolation, and generating of the configuration profile are repeated on a per-session basis and responsive to an initiation of a session.

9. The method of claim 1 further comprising:
   mapping the query in the relational language to one or more first API queries based on the configuration profile, the one or more API queries including a first API query, the first API query using the first API and sent to the first endpoint;
   mapping one or more responses to the one or more first API queries to a relational response based on the configuration profile, the relational response including the second set of results; and
   sending the relational response in response to the query in the relational language, wherein the query in the relational language is based on a user's request for the data returned in the relational response, and retrieved from the first endpoint.

10. The method of claim 1, wherein the first API is one of a representational state transfer (REST) API and a simple object access protocol (SOAP) API.

11. A system comprising:
    one or more processors; and
    a memory storing instructions that, when executed by the one or more processors, cause the system to:
      sample a first endpoint, the first endpoint exposed via a first application programming interface (API);
      receive, from the first endpoint and responsive to the sampling of the first endpoint, a first set of results, wherein the first set of results is a subset of data exposed by the first endpoint via the first API;
      automatically extrapolate, from the first set of results received from the first endpoint responsive to the sampling and based on a set of inference rules, an initial set of data types and an initial relational data structure representing the data stored by the first endpoint and exposed via the first API, the data stored by the first endpoint including the first set of results and additional data;
      generate a configuration profile based on the initial set of extrapolated data types and the first relational data structure representing the data stored by the first endpoint and exposed via the first API, the data stored by the first endpoint including the first set of results and additional data;
      receive a query in a relational query language; and
      obtain, using the configuration profile and via the first API, a second set of results from the first endpoint responsive to the query in the relational language, the second set of results including a subset of the additional data.

12. The system of claim 11 comprising instructions that, when executed by the one or more processors, cause the system to:
    merge the initial set of extrapolated data types and first relational data structure representing the data stored by the first endpoint and exposed via the first API with a second set of extrapolated data types and a second relational data structure representing the data stored by a second endpoint.

13. The system of claim 12, wherein the second endpoint is exposed via a second API, and the first API and second API differ.

14. The system of claim 11 comprising instructions that, when executed by the one or more processors, cause the system to:
    obtaining user input requesting modification; and
    generating a new configuration profile based on the requested modification.

15. The system of claim 14 wherein the user input requesting modification is a request to modify one or more of a data type, data structure, and normalization type.

16. The system of claim 11, wherein the sampling obtains the first set of results, which represent most recent data of the first endpoint.

17. The system of claim 11 comprising instructions that, when executed by the one or more processors, cause the system to:
  update the configuration profile responsive to one or more of a user-initiated request and automatically based on satisfaction of a criterion.

18. The system of claim 11, wherein the sampling, automatic extrapolation, and generating of the configuration profile are repeated on a per-session basis and responsive to an initiation of a session.

19. The system of claim 11 comprising instructions that, when executed by the one or more processors, cause the system to:
  map the query in the relational language to one or more API queries based on the configuration profile, the one or more API queries including a first API query, the first API query using the first API and sent to the first endpoint;
  map one or more responses to the one or more API queries to a relational response based on the configuration profile, the relational response including the second set of results; and
  send the relational response in response to the query in the relational language, wherein the query in the relational language is based on a user's request for the data returned in the relational response, and retrieved from the first endpoint.

20. The system of claim 11, wherein the first API is one of a representational state transfer (REST) API and a simple object access protocol (SOAP) API.

* * * * *